United States Patent [19]

Crawford et al.

[11] Patent Number: 5,323,062
[45] Date of Patent: Jun. 21, 1994

[54] SYSTEM FOR TRIAC TRIGGER CONTROL IN COMBINATION WITH A SENSING ELEMENT

[75] Inventors: John S. Crawford, Walkerville; Malcolm J. Kay, Lockleys; Philip A. Tracy, Epping, New South Wales, all of Australia

[73] Assignee: U. S. Philips Corporation, New York, N.Y.

[21] Appl. No.: 803,307

[22] Filed: Dec. 2, 1991

[30] Foreign Application Priority Data

Dec. 3, 1990 [AU] Australia .................................... 3669

[51] Int. Cl.$^5$ ............................................. H01H 35/00
[52] U.S. Cl. ......................................... 307/125; 307/632
[58] Field of Search ............... 307/310, 360, 355, 362, 307/632, 117, 118, 125, 130; 219/499, 501

[56] References Cited

U.S. PATENT DOCUMENTS

| | | | |
|---|---|---|---|
| 3,679,873 | 6/1972 | Bray et al. | 219/501 |
| 4,172,982 | 10/1979 | Kompelien | 307/117 |
| 4,590,363 | 5/1986 | Bernard | 219/501 X |
| 4,777,350 | 10/1988 | Crockett et al. | 219/501 X |

OTHER PUBLICATIONS

"RCA Silicon Power Circuits Manual"; RCA-Electronic Components and Devices Division; 1967; pp. 240-243.
"RCA Transistor Thyristor and Diode Manual"; RCA-Solid State Division; 1971; pp. 213-221.

Primary Examiner—A. D. Pellinen
Assistant Examiner—F. M. Fleming
Attorney, Agent, or Firm—Bernard Franzblau

[57] ABSTRACT

A trigger control circuit of the kind wherein a load is supplied via a triac with current from an AC voltage supply source under the control of a triac control means in combination with a sensing element. In previous circuits the sensing element is energized by a current from a DC source which is derived by rectification and smoothing of the alternating current of an alternating voltage supply source. These circuits have limitations in integrated circuitry. The sensing element herein is energized by an alternating current to produce a sensed alternating current. The triac control means includes an integration element for producing a control signal which represents of the integral of the difference between a value corresponding to the magnitude of the sensed alternating current and a reference value. The triggering or otherwise of the triac is determined by a latch actuated in response to the magnitude of the control signal relative to one or more threshold levels. The trigger control circuit may be used in thermostats or other sensing devices.

26 Claims, 4 Drawing Sheets

SYSTEM FOR TRIAC TRIGGER CONTROL IN COMBINATION WITH A SENSING ELEMENT

BACKGROUND OF THE INVENTION

The present invention relates to circuit arrangements of the kind wherein a load is supplied via a triac with current from an alternating voltage supply source under the control of a triac trigger control means in combination with a sensing element. As a rule, the said alternating voltage supply source is formed by an alternating mains voltage source.

Usually the sensing element is sensitive to the effects produced by the load. For example, the sensing element may be a temperature dependent resistance located in proximity to a load in the form of a heating element, in which case variations of the sensing element may be utilised to control triggering of the triac to ensure that the heat produced by the load remains within certain temperature limits. Generally, in known circuit arrangements of the kind to which the invention relates, the sensing element is energized by a current from a direct current source so as to produce a voltage for influencing operation of said triac control means. For instance, circuit arrangements of the kind to which the invention relates are known in which the triac trigger control means form part of an integrated circuit assembly incorporating a direct current supply source which, in operation, is able to be energized by the alternating voltage source. Accordingly, the sensing element is readily able to be energized from the direct current supply source forming a part of the integrated circuit assembly. Known circuit arrangements employing direct current energisation of the said sensing element have the disadvantage that unless battery supplies are available as a direct current source it is necessary to provide a source of direct current by rectification and smoothing of alternating current derived from the alternating voltage supply source. The provision of battery supplies is expensive, likewise the provision of a rectification and smoothing circuit if a direct current source is energized from a mains supply. In instances where the triac trigger control means form a part of an integrated circuit assembly incorporating a direct current supply source energized by the said alternating voltage source, utilization of the incorporated direct current supply source has the limitation that typical incorporated direct current supply sources deliver voltages of less than 12 volts in order to suit the power supply needs of the triac control system. For the energisation of the sensing element from a source of direct current it is preferable for the source to have a terminal voltage significantly larger than 12 volts in order to utilise the available operating range of the sensing element. For example, the resistance of a thermistor employed as a sensing element for an electric cooking appliance may vary by three orders of magnitude over the anticipated cooking range.

With circuit arrangements of the kind to which the invention relates, in practice it may be necessary for the load and the sensing element to be located remotely from the remainder of the circuit arrangement with the consequence that connection leads between the remotely located sensing element and the remainder of the circuit arrangement are susceptible to the pick-up of interference which may impair satisfactory operation of the circuit arrangement when the sensing element is energized from a source of direct current, unless the interference is filtered. Moreover, circuit arrangements of the kind to which the invention relates frequently employ a temperature setting element in addition to a temperature sensing element, which temperature setting element is energized from the same source of direct current so that in the event of the temperature setting element being remotely located, the connection leads thereto are also susceptible to the pick-up of interference unless provision is made for filtering such interference.

SUMMARY OF THE INVENTION

A circuit arrangement in accordance with the present invention has a number of novel features and, in comparison with known circuit arrangements of the kind to which the invention relates, displays many advantages which will be apparent from the following general description thereof and from the following description of individual embodiments of the invention.

In a circuit arrangement in accordance with the invention, a load is supplied, via a triac, with current from an alternating voltage source under the control of a triac trigger control means in combination with a sensing element, wherein said sensing element is energized by alternating current derived from the alternating supply source to produce a sensed alternating current and the said triac trigger control means includes an integration means for producing a control signal. Triggering of the triac is determined by the state of a latch actuated in response to the magnitude of the control signal relative to one or more threshold levels, during at least one state of the latch the control signal produced by the integration means representing of the difference between a value corresponding to the instantaneous of the sensed alternating current and a reference value.

The control signal can be produced by integration of the difference between the average peak to peak magnitude of the sensed alternating current and that of a reference alternating current, but the invention is not limited to production of the said control signal in this way.

One form of the invention is based upon the use of a single threshold and actuation of the latch in response to the magnitude of the control signal which is able to be carried out only when the latch is in a given state, such actuation being in response to the magnitude of the control signal relative to the single chosen threshold level, with actuation of the latch when its opposite state being produced by means other than in response to the control signal. For instance, the latch may be designed to automatically return to the given state after a fixed time period in its opposite state. In this way the latch may be arranged to function as a cyclic switch controlling the triggering of the triac in accordance with a duty cycle having a fixed time interval of continuous triac triggering and a variable time interval of non-triggering or vice versa. The length of each variable time interval is determined by the time taken for the magnitude of the control signal to reach the chosen threshold level.

Another form of the invention may be based upon the use of two thresholds. In this case, the latch has a reset state and a set state and changeover of the latch from the set state to the reset state (or vice versa) is actuated by the magnitude of the control signal exceeding a first threshold level, whereas changeover of the latch from the reset state to the set state (or vice versa) is actuated by the magnitude of the control signal falling below a second threshold level.

With a "two threshold level" form of the invention, the said triac trigger control means may be arranged so that here too the latch functions as a cyclic switch controlling the triggering of the triac in accordance with a duty cycle having a fixed time interval of continuous triac triggering and a variable time interval of non-triggering or vice versa. However, with the triac control means so arranged, while the length of each variable time interval is determined, during one latch state, as before, by the time taken for the magnitude of the control signal to reach one threshold level( for example, the first threshold level) there is a significant difference from the "single threshold level" form of the invention in that, during the other latch state, the control signal produced by the integration means does not represent the integration of the difference between the magnitude of the sensed alternating current and that of a reference alternating current. Instead, by utilization of a source of constant current the control signal produced by the integration means, during this other latch state, changes in magnitude at such a rate as to reach the other threshold level (for example, the second threshold level) at the end of a fixed time interval.

Alternatively, with a "Two Threshold Level" form of the invention, the said triac trigger control means may be arranged so that the latch functions as a cyclic switch controlling the triggering of the triac in accordance with a duty cycle having a variable time interval of continuous triac triggering and a variable time interval of non-triggering. In one system for achieving this, the said integration means comprises a capacitance which is charged and discharged at a rate proportional to the difference in magnitude between the said sensed alternating current and the said reference alternating current, with the voltage corresponding to the charge on the capacitance serving as the control voltage. With this system, the respective durations of both variable time intervals, commencing from the instant of latch changeover, is determined by the time taken for the magnitude of the control signal to reach the threshold level for the next latch actuation. In another system for achieving this, the triac trigger control means comprises comparator means for comparing the sensed alternating current with the reference alternating current and producing a first output signal when the sensed alternating current exceeds the reference alternating current and a second output signal when the sensed alternating current is below the reference alternating current, and switching means for coupling a first constant current source and a second constant current source to the integration means in response to the first output signal and the second output signal, respectively.

BRIEF DESCRIPTION OF THE DRAWING

The invention will now be described in greater detail with reference to the accompanying drawings, in which.

DESCRIPTION OF THE PREFERRED EMBODIMENTS

Figure 1:
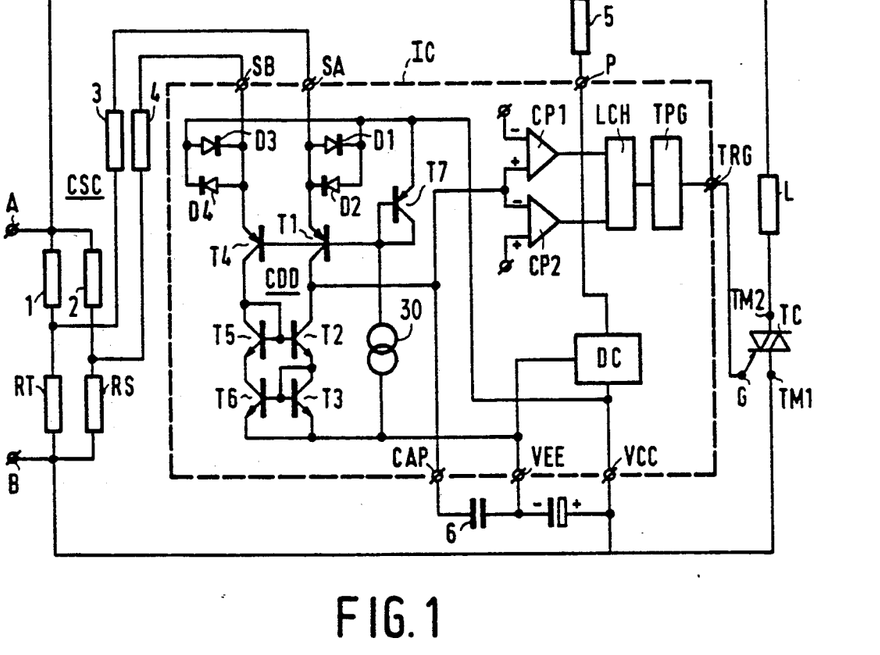
FIG. 1 is a schematic diagram, partly in block form, of an embodiment of the invention forming a part of an electrical heating appliance.

In the circuit arrangement of FIG. 1, a triac device TC having main current path terminals TM1 and TM2 and a gate terminal G is connected with its main current path in series with a load L across the terminals A and B of a conventional alternating mains voltage supply source (not shown) delivering a supply voltage of 240 volts at a frequency of 50 hertz to the terminals A and B, the terminal A being the active terminal and the terminal B being the neutral terminal of the mains supply source. The load L constitutes the heating element of the appliance and the remainder of the circuit arrangement of FIG. 1 provides a system for controlling the supply of current to the load L so that the by the load L maintains the temperature of body being heated at or near a temperature selected by the user.

The triac TC is triggered by gating pulses supplied to its gating electrode G from an output terminal of an integrated circuit assembly IC generally signified by that portion of the Figure enclosed within dotted lines. The gating pulses are supplied from a trigger pulse generator TPG forming a part of the integrated circuit assembly IC. The operating condition of the trigger pulse generator TPG is dictated by the "on" and the "off" state of a latch LCH in a manner such the trigger pulse generator TPG is operative when the latch LCH is in the "on" state and is inoperative when the latch LCH is in the "off" state. When the trigger pulse generator TPG is operative, a continuous stream of gating pulses in synchronism with the alternating supply voltage is supplied to the electrode G of the triac TC. In a known manner, the application of gating pulses to the electrode G renders the triac TC conductive so that current flows from the alternating supply voltage source via the load L and the triac TC causing heat to be dissipated in the load ,L. The trigger pulse generator TPG may, for example, be in the form described in the co-pending Australian Patent Application No. 31615/89, which corresponds to U.S. Pat. No. 4,959,558 (Sep. 25, 1990), in which a trigger pulse Is produced at every so-called "zero crossing point" between alternate half cycles of the alternating voltage of the mains supply.

A direct current supply source DC is incorporated within the integrated circuit assembly IC and is energized from the alternating mains voltage supply. For this purpose the source DC is connected via a voltage dropping resistance 5 to the terminal A and also to the terminal B via the terminal VCC. In known manner, direct current is produced by the source DC by means (not shown) of a zener diode and associated circuitry in combination with a capacitance connected between terminals VCC and VEE of the integrated circuit assembly IC so that a fixed potential of 7.5 volts is produced between the terminals VCC and VEE, the terminal VCC being positive relative to the terminal VEE. By means of connections (not shown) the voltage present between the terminal VCC and VEE is supplied, inter alia, to energize the trigger pulse generator TPG and the latch LCH.

In addition to the trigger pulse generator TPG and the latch LCH, the triac trigger control means includes a pair of voltage comparators CP1 and CP2, a current difference detection means generally denoted as CDD, an integration means in the form of a capacitance 6 connected between the terminal CAP and the terminal VEE and a current sensing circuit denoted generally as CSC. The current sensing circuit CSC includes a pair of current dividing networks One current dividing network comprises the series combination of a fixed resistance 1 and a temperature sensing resistance RT having a negative temperature co-efficient resistance, whereas the other current dividing network comprises the series combination of a fixed resistance 2 and an adjustable resistance RS. Both current dividing networks are connected across the terminals A and B of the alternating mains voltage source and in this way the temperature sensing resistance RT and the adjustable resistance RS are respectively energized thereby so that the current which flows via the Resistance RT may be termed a "Sensed Alternating Current" and the current which flows via the resistance RS may be termed a "Reference Alternating Current". The sensing element RT thus is energized by an alternating current which is continuously proportional to the alternating voltage supply source at terminals A, B. The resistance values of the Resistances 1 and 2 are chosen relative to the respective resistance values of the resistances RT and RS so that the voltages developed respectively across the resistance RT and RS are variable over a satisfactory voltage range in proportion to a variation of the magnitude of the sensed alternating current and that of the reference alternating current, variation of the magnitude of the sensed alternating current being produced by temperature changes sensed by the resistance RT and variation of the reference alternating current being produced by manual adjustment of the resistance RS by a user operation to select a desired temperature. In practice, the temperature sensing resistance RT may be located in close proximity to the object being heated by the load L and, as a consequence, the conductors for providing electrical connection between the resistance RT and the remainder of the network are susceptible to the pick-up of interference. In practice, it is sometimes required that the adjustable resistance RS also be remotely located from the remainder of the network of which it forms a part so as to facilitate manual adjustment of the temperature desired by the user and, as a consequence, in such circumstances conductors for providing electrical connection to the remotely located resistance RS are also susceptible to the pick-up of interference. The junction of the resistance 1 with the temperature sensing resistance RT is connected via the current setting resistance 3 to the terminal SA of the integrated circuit assembly IC for supplying thereto a sensed alternating current, whereas the junction of the resistance 2 with the adjustable resistance RS is connected via the current setting resistance 4 to the terminal SB of the integrated circuit assembly IC for supplying thereto a reference alternating current.

The current difference detector means CDD is composed of the series combination of the emitter-collector paths of three transistors T1,T2 and T3 between the terminal SA and the terminal VEE and the series combination of the emitter-collector paths of three transistors T4,T5 and T6 between the terminal SB and the terminal VEE. The terminal SA is connected via the diodes D1 and D2 to the terminal VCC whereas the terminal SB is connected via the diodes D3 and D4 to the terminal VCC. The base electrodes of the transistors T1, T4 and T7 and the collector electrode of the transistor T7 are all connected to a common point which is connected via a constant current source 30 to the terminal VEE. The emitter electrode of the transistor T7 is connected to the terminal VCC so that the base voltages of transistor T1 and transistor T4 are held one VBE below the voltage on terminal VCC. Thus, when the transistors are operating, the normal operating VBE of transistor T1 and transistor T4 ensures that the voltage on the emitters of these transistors is close to the voltage of terminal VCC. The transistors T2,T5,T3 and T6 are interconnected so as to function as a current mirror circuit in which the magnitude of the flow of the current via the series combination of the collector-emitter paths of the transistors T2 and T3 tends to follow and be equivalent to the magnitude of the flow of current via the series combination of the collector-emitter paths of the transistors T5 and T6. The collector electrode of the transistor T1 is connected via the terminal CAP and the capacitance 6 to the terminal VEE.

It will be appreciated that the temperature sensing resistance RT is shunted by the resistance 3 in series with the parallel combination of the emitter of the transistor T1 and the diodes D1 and D2, whereas the adjustable resistance RS is shunted by the resistance 4 in series with the parallel combination of the emitter of the transistor T4 and the diodes D3 and D4. However, the resistance value of the resistance 3 is large relative to that of the temperature sensitive resistance RT and the resistance value of the resistance 4 is large relative to that of the adjustable resistance RS. In addition, the emitter-collector paths of the transistors T1, T2 and T3 are connected in series with the output circuit of the direct current source DC across the diodes D1 and D2, whereas the emitter-collector paths of the transistors T4, T5 and T6 are connected in series with the output circuit of the direct current source DC across the diodes D3 and D4.

The difference between the current applied to terminal SA and to terminal SB dictate the operation of the circuit of FIG. 1 and in this respect, owing to the action of the diodes D1 and D3, the respective voltages produced at the terminals SA and SB are clamped at a voltage equal to one VBE below the voltage of the terminal VCC during each negative half cycle of the alternating supply voltage across the terminals A an B. During these negative half cycles, the transistors T1 and T4 are both biased-off and are non-conductive. During positive half-cycles of the alternating supply voltage both of the transistors T1 and T4 are conductive, the respective voltages present at the terminals SA and SB each being within a few millivolts of the voltage of the terminal VCC. During such positive half-cycles, the relative magnitudes of the respective emitter-collector currents of the transistors T1 and T4 are determined by the relative magnitudes of the current supplied to the terminal SA from the junction of resistance 1 and the temperature sensitive resistance RT and the current supplied to the terminal SB from the junction of the resistance 2 with the adjustable resistance RS. The diodes D1 and D3 do not conduct during positive half cycles of the supply voltage unless abnormal conditions exist. In operation, if the magnitude of the sensed alternating current fed via the terminal SA is larger than the reference alternating current fed via the terminal SB, then the emitter-collector current of the transistor T1 will be greater than the emitter-collector current of the transistor T2 causing the capacitance 6 to be charged by the current difference in a direction for the terminal CAP to go positive relative to the terminal VEE. On the other hand, if the magnitude of the reference alternating current fed via the terminal SB is larger than the sensed alternating current fed via the terminal SA, then the emitter-collector current of the transistor T4 will be greater than that of the transistor T1. In these circumstances, owing to the current mirror action of the transistors T2,T3,T5 and T6, the magnitude of current drawn by the collector-emitter path of transistor T2 will be greater than collector-emitter current of the transistor T1 causing the capacitance 6 to be discharged towards the potential VEE. With alternating current flow of equal magnitude via the respective terminals SA and SB, the charge on the capacitance 6 will remain constant. Assuming that the resistive value of the resistance 1 is equal to that of the resistance 2, the relative magnitudes of the alternating current flow via the terminals SA and SB is dictated by the relative resistive values of the temperature sensing resistance RT and the adjustable resistance RS.

By means of the two voltage comparators CP1 and CP2, the voltage across the capacitance 6 (i.e. the voltage present at the terminal CAP relative to the voltage of the terminal VEE) is employed as a control signal for controlling the on/off state of the latch LCH and hence for controlling operation or otherwise of the trigger pulse generator TPG. To this end, the terminal CAP is connected to the positive input of the comparator CP1 and to the negative input of the comparator CP2. The negative input of the comparator CP1 is connected to a potential which is 0.6 volts negative relative to the terminal VCC whereas the positive input of the comparator CP2 is connected to a potential which is 1.2 volts positive relative to the terminal VEE. In this way the potentials applied respectively to the negative terminal of the comparator CP1 and to the positive terminal of the comparator CP2 serve as threshold levels whereby the output of the comparator CP1 is activated if the potential of the terminal CAP exceeds the potential of its negative input causing the latch LCH to be switched to its "on" state. Alternatively, the output of the comparator CP2 is activated if the potential of the terminal CAP falls below the potential of its positive input causing the latch LCH to be switched to its "off" state.

Figure 2A:
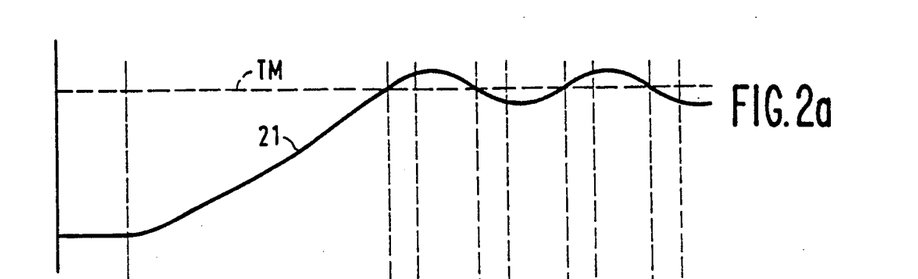
FIGS. 2a-2f are a family of graphs related to the operation of the circuit arrangement of FIG. 1.
Figure 2B:
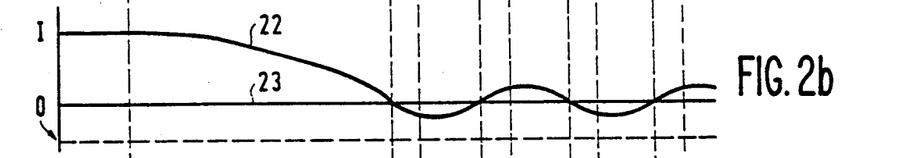
Figure 2C:
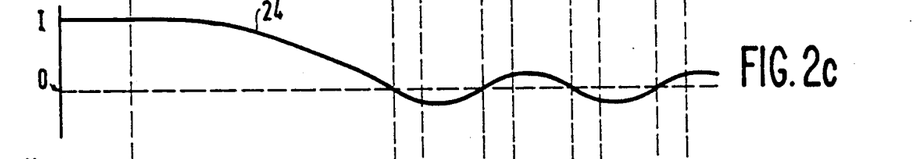
Figure 2D:
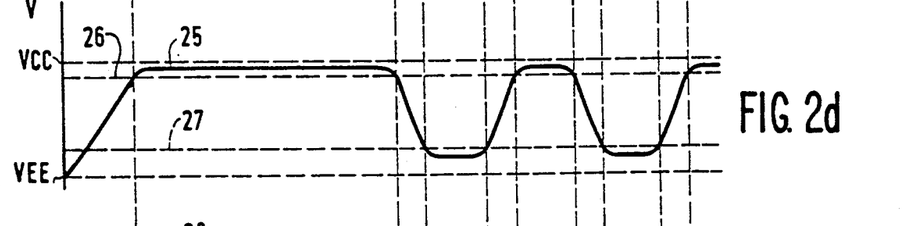
Figure 2E:
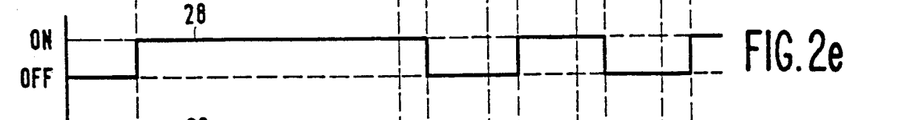
Figure 2F:
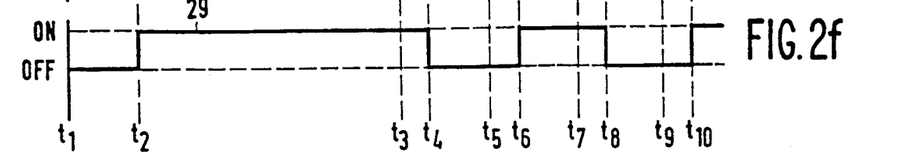

It will be realised that the circuit arrangement of FIG. 1 is a "two-threshold level" form of the invention. The cyclic operation of the circuit arrangement of FIG. 1 may be understood from the drawings of FIG. 2 which shows graphs depicting conditions at different parts of the circuit arrangement of FIG. 1 over a period of time, a common time relationship existing between all the graphs of FIG. 2. In this respect, in FIG. 2 (a) the temperature of the sensing resistance RT is denoted by the solid line 21. In FIG. 2 (b) the average magnitude of the sensed alternating current relative to zero, fed to the terminal SA via the resistance 3, is denoted by the solid line 22 and the average magnitude of the reference alternating current relative to zero fed to the terminal SB via the resistance 4 is denoted by the solid line 23. In FIG. 2 (c) the solid line 24 denotes the magnitude of the difference between the currents represented respectively as 22 and 23. It follows that the portion of the line 24 above the zero—reference line 0 represents the current flowing into the capacitance 6 and the portion of the line 24 below the zero—reference line 0 represents the current flowing out of the capacitance 6. In FIG. 2(d), the solid line 25 represents the voltage present across the capacitance 6, the dotted line 26 representing the upper threshold level at a voltage equivalent to the voltage at the terminal VCC less 0.6 volts and the dotted line 27 representing the lower threshold at a voltage equivalent to the voltage of the terminal VEE plus 1.2 volts. In FIG. 2 (e) the line 28 represents the "on" and the "off" state of the latch LCH and in FIG. 2 (f), the line 29 represents the state of operation of the trigger-pulse generator TPG and hence indicates also whether or not the triac TC is being triggered.

If now the circuit arrangement of FIG. 1 is considered together with the family of graphs of FIG. 2 and it is assumed the circuit arrangement of FIG. 1 is switched on at the instant t1 with the adjustable resistance RS set to a desired temperature, which higher temperature at the instant t1 than that of the body intended to be heated by the load L. Under such conditions, the resistance of the sensing resistance RT will be higher than the resistance of the adjustable resistance RS and consequently the voltage developed across the sensing resistance RT will be high relative to the voltage developed across the resistance RS so that the magnitude of the sensed alternating current supplied via the terminal SA will be greater than the magnitude of the reference alternating current supplied via the terminal SB as 23. At the instant t1, the voltage across the capacitance 6 is assumed to be zero with the latch LCH in its "off" state so that the trigger pulse generator TPG is non-operative and the triac TC is non-conductive and no current is flowing via the load L. Since current supplied via the terminal SA is greater in magnitude than the current supplied via the terminal SB, then owing to the action of the current difference detector CDD, the capacitance 6 is charged via the emitter-collector path of the transistor T1 so that the voltage at the terminal CAP rises relative to the voltage at the terminal VEE as shown by the line 25 of FIG. 2 (d). The voltage at the terminal CAP continues to rise towards the voltage at the terminal VCC until at the instant t2 the voltage at the terminal CAP reaches the upper threshold level denoted by the dotted line 26, whereupon the output of the comparator CP1 is activated and the latch LCH is switched to its "on" state causing the trigger generator TPG to operate and generate a continuous supply of trigger-pulses which are fed to the gate electrode G of the triac device TC so that the triac TC conducts and alternating current flows from the mains alternating current source via the load L and via the triac TC. The flow of alternating current via the load L heats the body associated with the load L and the temperature of the sensing resistance RT commences to rise as indicated by the line 21 in FIG. 2 (a) between the instant t2 and the instant t3. As the temperature of the body sensed by the sensing resistance RT rises, in due course the resistance of the sensing resistance RT falls and the difference between the magnitude of the sensed alternating current fed to the terminal SA and that of the reference alternating current fed to the terminal SB diminishes as indicated by the line 22 in FIG. 2 (c) and by convergence of the lines 22 and 23 in FIG. 2 (b).

As the temperature sensed by the resistance RT continues to rise, the difference between the magnitude of the sensed alternating current and that of the reference alternating current grows less and less until at the instant t3 the difference between the two is zero, the instant t3 being the instant at which the resistance of the sensing resistance RT is equal to the resistance of the adjustable resistance RS.

At this instant, the magnitude of the sensed alternating current fed to the terminal SA is equal to that of the reference alternating current fed to the terminal SB and the emitter-collector current of the transistor T4 is equal in magnitude to that of the transistor T1. Owing to the previously described current mirror action, the collector-remitter current of the transistor T2 corresponds to the emitter-collector current of the transistor T4 so that, at the instant t3, current flow charging the capacitance 6 via the transistor T1 is in balance with the current flow discharging the capacitance 6 via the transistor T2. Following the instant t3, the magnitude of the sensed alternating current fed via the terminal SA is less than that of the reference alternating current fed via the terminal SB. Accordingly, current flow via the emitter-collector path of the transistor T4 and also current flow via the collector-emitter path of the transistor T2 is greater than the current flow via the emitter-collector path of the transistor T1 so that the capacitance 6 commences to be discharged via the transistor T2. Between the instant t3 and t4, since the sensed alternating current is less than the reference alternating current, the capacitance 6 discharges and as the voltage at the terminal CAP reaches the lower threshold, as denoted by the intersection of the line 25 with the dotted line 27 at the instant t4, the output of the comparator CP2 is activated causing switch over of the latch LCH to its "off" state, switching off the generator TPG and hence the supply of trigger pulses to the triac TC which ceases to conduct, cutting off the supply of alternating current to the load L.

Between the instants t3 and t4, the generator TPG is operational and current is supplied to the load L via the triac TC so that the body sensed by the resistance RT continues to be heated and the resistance of the sensing resistance RT continues to fall so that the difference between the magnitude of the sensed alternating current and that of the reference alternating current increases in the opposite direction, i.e. with the reference alternating current greater than the sensed alternating current. However, following the instant t4, owing to the cut-off of the supply of current to the load L, the temperature of the sensing resistance RT reaches a maximum as indicated by the line 21 in FIG. 2 (a). At the same time the sensed alternating current reaches a maximum as shown by the line 22 in FIG. 2 (b) and the difference current (i.e. the current at the terminal CAP) as denoted by the line 24 in FIG. 2 (c) reaches a maximum in the reverse direction. After reaching a maximum, the temperature of the resistance RT starts to fall, the magnitude of the difference current as denoted by the line 24 starts to diminish falling to zero at the instant t5 when the current fed via the emitter-collector path of the transistor T1 is once again equal in magnitude to the collector-emitter current of the transistor T2. Subsequent to the instant t5, as the temperature continues to fall and with the magnitude of the sensed alternating current becoming greater than the reference current, the capacitance 6 commences to be charged again and the voltage at the terminal CAP starts to rise once more towards the upper threshold level denoted by the dotted line 26 in FIG. 2 (d). When the upper threshold level is reached, the output of the comparator CP1 is activated and the generator TPG again supplies triggering pulses to the triac TC so that current is again supplied to the load L, whereupon the sequence of operations is repeated cyclically as depicted by the family of graphs of FIG. 2.

It can be seen from the graphs of FIG. 2 that subsequent to the instant t3, the temperature sensed by the resistance RT remains within a particular temperature range about a mean temperature level denoted by the dotted line TM. Adjustment of the resistance RS permits the magnitude of the reference alternating current to be adjusted with corresponding adjustment of the resultant mean temperature level.

For a given body heated by the load L, subsequent to the instant t3 the duty cycle performed by the latch LCH automatically stabilizes at a ratio determined by the setting of the adjustable resistance RS and the ambient temperature thereby governing the mean temperature of the body and the resultant sensed temperature which cyclically fluctuates at the same frequency as that of the switching frequency of the latch LCH over a certain temperature range approximately centred on the temperature TM which is, of course, also dependent upon the setting of the resistance RS.

The circuit arrangement of FIG. 1 permits a temperature sensitive resistance to be utilized as the resistance RT having a resistance which varies by several orders of magnitude over the temperature range to be sensed. The integration means constituted by the capacitance 6 and associated circuitry inter alia, performs a filtering function preventing inadvertent switching of the latch LCH by transient voltages resulting from the pick-up of interference by connection leads to the sensing resistance RT and to the adjustable resistance RS.

The graphs of FIG. 2 indicate thermal mass delay effects. That is to say, the shape of the line 21 in FIG. 2 (a), consequently the shape of the line 22 of FIG. 2 (b) and the shape of the line 24 of FIG. 2 (c) show that the load L of FIG. 1 is employed, in this instance, to heat a body having characteristics such that a significant period of time elapses for the temperature sensed by the resistance RT to be effected by "switch on" or "switch off" of the generator TPG and hence conductivity or otherwise (i.e. cut-off) of the triac TC.

If the circuit arrangement of FIG. 1 were to be employed so that the load L heated a body having no thermal mass delay then at the instant t4, the temperature shown by the line 21 in FIG. 2 (a) would immediately and rapidly fall owing to "switch off" of the generator TPG and at the instant t6, the temperature shown by the line 21 would immediately start to rise owing to "switch on" of the generator TPG. In addition, in such circumstances, the time period between the instants t4 and t5 would be significantly reduced since the rapid temperature drop would cause the sensed current to rapidly increase in magnitude. However, in the circumstances illustrated by the graphs of FIG. 2, not only does the sensed temperature denoted by the line 21 continue to rise following the instant t3 (when the sensed alternating current is equal to the reference alternating current) during the "reaction time" up until the instant t4, while the capacitance 6 is discharging to the lower threshold level as indicated by the line 25 but, as previously mentioned, the sensed temperature denoted by the line 21 continues to rise following the instant t4 owing to thermal mass delay. Corresponding effects in the reverse direction are evident between the instant t5 and the instant t6 and between the instants t6 and t7. In total, there is significant "overshoot" and "undershoot"

by the line 21 of the mean temperature denoted by the dotted line TM in FIG. 2 (a).

In other words, subsequent to the t3, there is a variation of the temperature of the body and also of the sensed temperature denoted by the line 21 over a considerable range about the mean temperature TM. The shape of the line 21 is typical of a situation in which the circuit arrangement of FIG. 1 is employed for heating a water bed where a large mass is being heated by the load L, which mass is also subject to the effects of convection, and there may be a significant temperature gradient between the load L and the sensing resistance RT. It will be realised that the "overshoot" and "undershoot" previously referred to results from a combination of the "reaction time" of the circuit arrangement of FIG. 1 and of the thermal body delay of the mass being heated by the load L. Thermal mass delay is determined, inter alia, by the rate of heat radiation by the mass being heated (which depends, of course, upon the size and the nature of the mass.) as well as the size and nature of the heating element together with the rate at which heat is able to flow between the heating element and the mass being heated. Reduction of the "overshoot" and "undershoot" may be desirable in some instances.

Many variations of the circuit arrangement of FIG. 1 are possible within the scope of the present invention. One such variation is depicted by the circuit arrangement of FIG. 3 which shows systematically a portion of the circuit arrangement of FIG. 1 which has been modified to provide a two-position switching unit SU between the terminal CAP and the junction of the collector electrodes of the transistors T1 and T2. The switching unit SU has two positions. In position A, the terminal CAP is connected to the junction of the collector electrodes of the transistors T1 and T2 and the resultant circuit arrangement corresponds with the circuit arrangement of FIG. 1. When the switching unit SU is in position B, the terminal CAP is connected to the terminal VEE via a constant current source SCE. The switching unit SU is controlled by the output of the latch LCH in a manner such that with the latch LCH in the "off" state, the switch SU is in position A, whereas with the latch LCH in the "on" state, the switch SU is in position B. The current supplied by the source SCE flows in the direction which will discharge the capacitance 6 when the latter is positively charged relative to the voltage of the terminal VEE.

The variation provided by the circuit arrangement of FIG. 3 causes the resultant modified circuit arrangement of FIG. 1 to operate in a basically similar manner to the operation of FIG. 1 described with reference to the graphs of FIG. 2 except that each occurrence when the charge on the capacitance 6 reaches the upper threshold level thereby causing the latch LCH to be switched to its "on" state so that the triac TC is triggered and current flows via the load L heating the body, then the switch SU is changed to position B and causes the capacitance 6 to be discharged towards the low threshold level at a steady rate. With each such occurrence, since discharge of the capacitance 6 from the voltage of the upper to that of the lower threshold level is at a steady rate, each period of time taken to complete the discharge to the voltage of the lower threshold level is a fixed duration. Of course, when the charge on the capacitance 6 reaches the lower threshold level, the latch LCH is switched to its "off" state so that the triac TC commences to be triggered cutting-off the supply of the current to the load L while the switch SU is returned once more to the position A permitting the capacitance 6 to be charged once more towards the upper threshold level whenever the magnitude of the sensed alternating current supplied via the terminal SA is greater than that of the reference alternating current supplied via the terminal SB.

Figure 3:
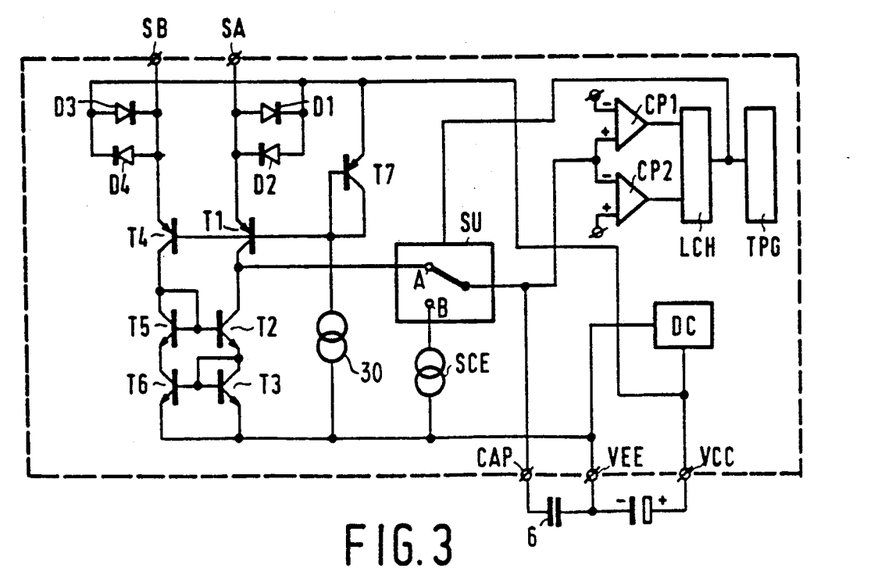
FIG. 3 is a diagram showing a variation of the circuit arrangement of FIG. 1.

The variation provided by the circuit arrangement of FIG. 3, in operation, results in the latch LCH having "on" periods of fixed duration and "off" periods of variable duration. The duration of the "off" periods of the latch LCH is determined by the difference between the magnitude of the sensed alternating current supplied via the terminal SB and that of the reference alternating current supplied via the terminal SA. If the setting of the adjustable resistance RS corresponds with a temperature which is greater than the temperature sensed by the resistance RT, then the magnitude of the sensed current will be greater than that of the reference alternating current. The larger the magnitude of the sensed alternating current relative to that of the reference alternating current, the shorter is the duration of the "off" period of the latch LCH. The constant current source SCE should be proportioned so as to produce a current of a magnitude which will result in the latch LCH having fixed "on" periods of a duration which is long relative to the duration of an "off" period of the latch LCH under conditions when the magnitude of the sensed alternating current is much larger than that of the reference alternating current so that, under such conditions, the resultant duty-cycle of the latch LCH is composed of a fixed "on" period and a relatively short "off" period whereby the flow of mains alternating current through the load L is interrupted only for relatively short intervals.

When the body being heated by the load L has reached a temperature such that the temperature sensed by the resistance RT is at or near the temperature setting of the resistance RS, then the difference in magnitude between the sensed alternating current supplied via the terminal SA and that of the reference alternating current supplied via the terminal SB will be relatively small so that the duration of time for the capacitance 6 to be charged from the voltage of the lower threshold to that of the upper threshold will be relatively long and these conditions will result in the duration of the "off" periods of the latch LCH being comparable to the fixed duration of the "on" periods Accordingly, the duty cycle performed by the LCH becomes stabilised so that the mean level of the body being heated by the load L and consequently the sensed temperature corresponds with the temperature setting of the adjustable resistance RS.

Figure 4:
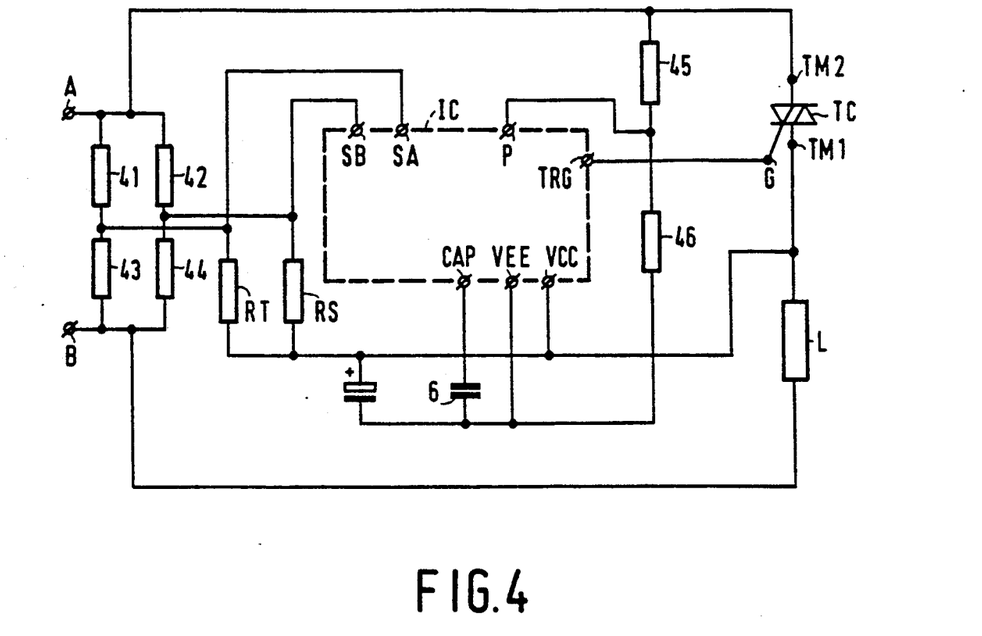
FIGS. 4 and 5 are diagrams of schematic circuit arrangements showing other variations of the circuit arrangement of FIG. 1.

Another variation of the circuit arrangement of FIG. 1 is depicted by the schematic circuit arrangement in FIG. 4 of the accompanying drawings in which like parts to those of FIG. 1 are denoted by like numerals or letters. A consideration of the graphs provided by FIG. 2 (a) and FIG. 2 (c) shows that the presence of thermal mass delay causes "overshoot" and "undershoot" and thus imposes a hysteresis effect upon the operation of the circuit arrangement of FIG. 1.

In the circuit arrangement of FIG. 4, the fixed resistances 41 and 43 are connected in series across the terminals A and B with the sensing resistance RT connected between the junction of the resistances 41 and 43 and the terminal VCC. Likewise, the fixed resistances 42 and 44 are connected in series across the terminals A and B with the adjustable temperature-setting resistance RS connected from the junction of the resistances 42 and 44 to the terminal VCC. The resistances 42, 43 and 44 each have a resistance value of 470 kilohms whereas the resistance 41 has a resistance value of 420 kilohms. The terminal VCC is connected to the junction of the triac TC and the load L. In operation, when the triac TC is conducting the whole of the mains alternating voltage is developed across the load L but, when the triac TC is cut-off, the whole of the mains alternating voltage is developed across the triac TC. Since the resistances RT and RS are connected to the junction of the triac TC and the load L, the current drive for both the sensing resistance RT and for the adjustable resistance RS are taken from across the triac TC when the latch LCH is in the "off" state and from across the load L when the latch LCH is in the "on" state. Accordingly, the circuit arrangement of FIG. 4 provides a feedback system since, owing to the imbalance of the bridge network formed by the resistances 41, 42, 43 and 44 as a consequence of the lower resistance value of the resistance 41, each time the latch LCH is switched from one state to the other and the current drive for the resistance RT and RS is changed, then the sensed alternating current supplied via the terminal SA is driven further out of balance then would be the case if the resistance 41 was equal in value to the resistances 42, 43 and 44.

The feedback system provided in the circuit arrangement of FIG. 4 is such that the out of balance current drive to the resistance RT increases the magnitude of the current difference between the sensed alternating current supplied via the terminal SA and the reference alternating current supplied via the terminal SB causing a more rapid charge or discharge of the capacitance 6 from one threshold level to the other than would otherwise be the case. This results in a reduction of the cycling period of the latch LCH and a reduction of "overshoot" and "undershoot" of the selected mean temperature determined by the setting of the resistance RS.

It will be understood that in the feed back system of the circuit arrangement of FIG. 4, the percentage of feed back will depend upon the relative values of resistances 41 and 43. Moreover, feed back in the opposite direction is produced when the resistance value of the resistance 41 is greater than that of the resistance 43. Feed back is also able to be produced if the resistance values of the resistances 41 and 43 are equal and those of the resistances 42 and 44 are unequal.

In the circuit arrangement of FIG. 4, it is to be noted that the common connection of the resistance RT with the junction of the load L and the triac TC follows the teachings of the applicants co-pending Australian Patent Application No. PK2501.

Figure 5:
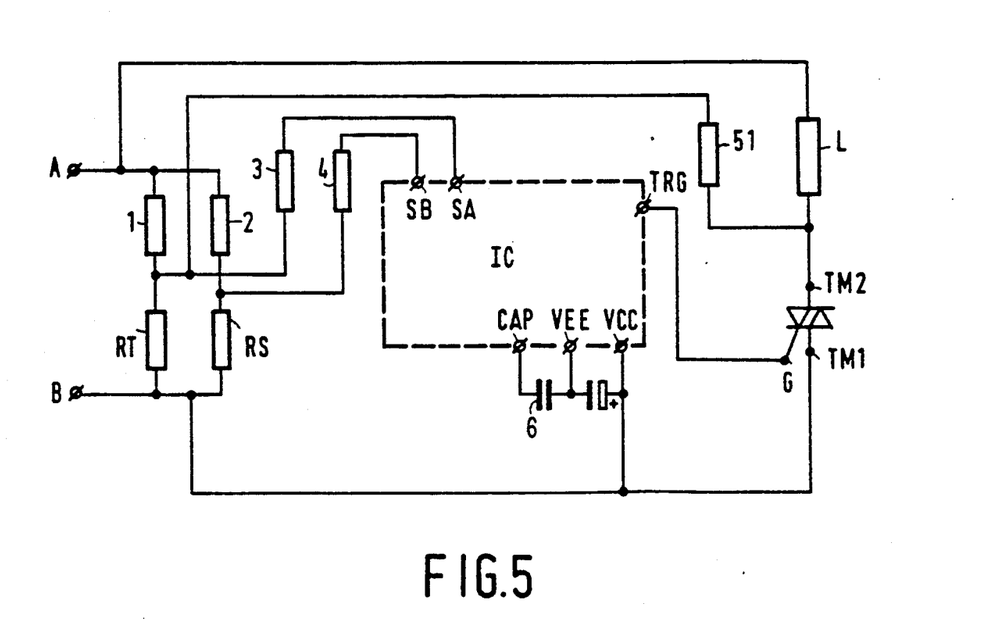

The circuit arrangement of FIG. 5, in which similar parts to those of FIG. 1 are denoted by like numerals or letters, is another example of the application of feed back to achieve the same result as that achieved by the circuit arrangement of FIG. 4. The circuit arrangement of FIG. 5 is intended to illustrate a circuit arrangement which is identical to that of FIG. 1 except that feed back current is applied from the junction of the triac TC and the load L via a feed back resistance 51 to the junction of the resistance 1 and the sensing resistance RT. It will be understood that either a positive or negative feed back may be obtained in the circuit arrangement of FIG. 5. In a variation of the circuit arrangement of FIG. 5, the feed back resistance 51 may be connected to the junction of the resistance RS and resistance 2. It will be understood that all else being equal, this variation will have a feed back of opposite sense to that of the circuit arrangement of FIG. 5.

It will be realized that a circuit arrangement on the basis of a single threshold form of the invention is readily conceivable which circuit operates a somewhat similar manner to the circuit arrangement permitted by the variation associated with the circuit arrangement of FIG. 3. Such a single threshold form may, for instance, be provided by a further modification to the circuit arrangements of FIG. 1 and of FIG. 3 of a kind such that the comparator CP2 is eliminated and the latch LCH is replaced by a latch of known kind provided with a timing system not related to the capacitance 6 so that the latch nevertheless has an "on" period of fixed duration. In addition, the constant current source SCE is replaced by a diode so that each time the latch LCH is activated into the "on" state causing the switching unit SU to return to its position B, the capacitance 6 is rapidly discharged.

Another simple variation of the circuit arrangement of FIG. 1, which is equally applicable when the variation associated with the circuit arrangement of FIG. 3 is also incorporated, is for the resistances RT and RS to be replaced by fixed resistances and for the resistances RT and RS to be 1 respectively connected in series with the resistances 3 and 4.

As previously indicated, an important feature of the present invention is the energization of the temperature sensing resistance by alternating current derived from the alternating supply source. The present specification describes how the resultant alternating current signal is utilized to provide a satisfactory input for a direct current input comparator system. This is achieved, in the case of the circuit arrangement of FIG. 1 by way of an integration means in the form of the capacitance 6 and the circuitry associated therewith which provides an interface between the current difference detector CDD and the comparators CP1 and CP2. It is useful to recognize that the transistors T1 and T4 conduct only when the polarity of the input signal at the terminals SA and SB is positive relative to the voltage of the terminal VEE. When the polarity of the input signal at the terminals SA and SB is negative, the transistors T1 and T4 will not conduct so that no current flows into or out of the capacitance 6 and during this time the charge on the capacitance 6 remains unchanged. Accordingly, a different current (i.e. a current which is the difference between the sensed alternating current flowing via the terminal SA and the reference alternating current flowing via the terminal SB) flows to or from the capacitance 6 via the terminal CAP for only a part of the time (i.e. approximately only during positive half-cycles of the alternating supply voltage). The arrangement thus serves to extend the integration times of the capacitance 6 and the resultant integrating times are greater than would be obtained with a direct current energized circuit employing equivalent components values.

A further embodiment of the invention will now be described with reference to FIG. 6 of the accompanying drawings which illustrates systematically a significant modification of the integrated circuits unit IC, like parts to those of FIG. 1 being denoted by like letters or numerals. In the circuit arrangement of FIG. 6, the capacitance 6 is not charged by current supplied via the transistor T1 or discharged by the flow of current via the transistor T2. Instead, the terminal CAP is connected to a two-position switching unit 63 which is also connected via a constant current source 61 to the terminal VCC and via a constant current source 62 to the terminal VEE whereby the capacitance 6 is charged via the constant current source 61 when the switching unit 63 is in the position denoted by the letter X and is discharged via the constant current source 62 when the switching unit 63 is in the position denoted by the letter Y. The switching position of the unit 63 is controlled by the output of a current comparator 64 having one input 65 connected to the junction of the collector electrodes of the transistors T1 and T2. The other input 66 of the comparator 64 is connected to a suitable direct current reference source (not shown). The comparator 64 is of a known kind and its input 65 presents a low-impedance to the junction of the collector electrodes of the transistors T1 and T2 such that current flows via the input 65 into or out of the comparator 64 depending upon whether or not the current difference between the sensed alternating current supplied via the terminal SA and the reference alternating current supplied via the terminal SB is positive or negative When the current difference is positive, the output of the comparator 64 switches the unit 63 to the position X which charges the capacitance 6 towards the upper threshold level and when the current difference is negative, the output of the comparator 64 switches the unit 63 to the position Y which discharges the capacitance 6 towards the lower threshold.

Figure 6:
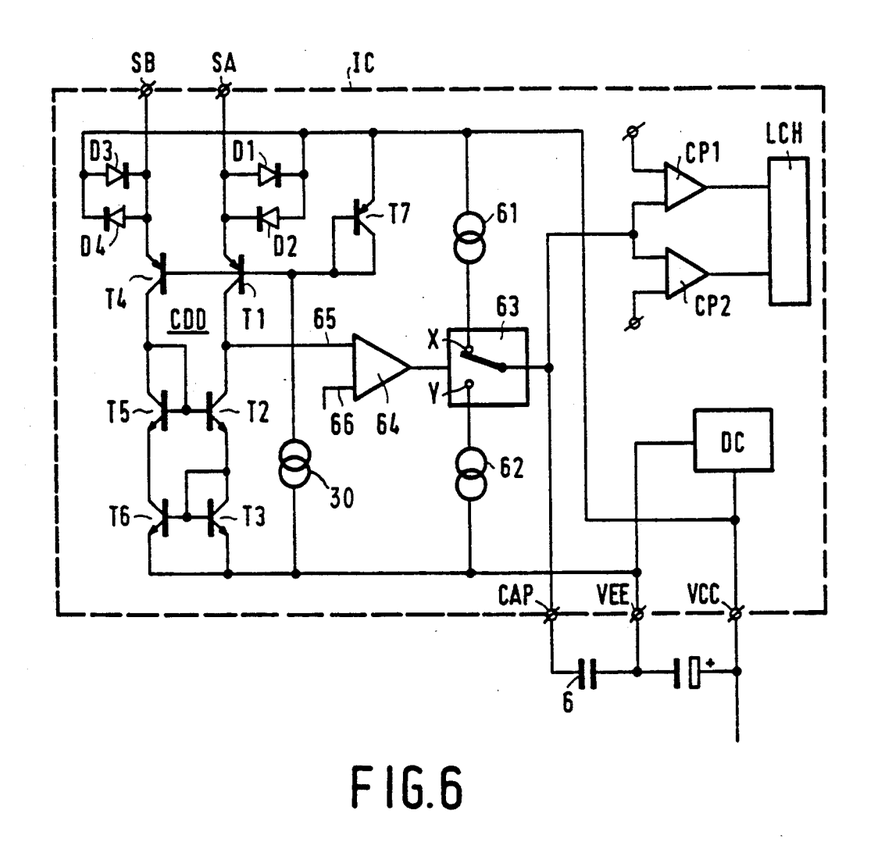
FIG. 6 is a diagram of a schematic circuit arrangement, partly in block form, of another embodiment of the invention.

A number of different design possibilities are available with the circuit arrangement of FIG. 6. For example, the constant current sources 61 and 62 may be proportioned to supply current of equal magnitude and, in these circumstances, if the switch unit 63 is driven so that there is an equal amount of time in position X as in position Y over a given period of time as a result of the difference between the sensed alternating current and the reference alternating current changing from a positive difference to a negative difference, then there will be equal amounts of time during which the capacitance 6 is charged and discharged so that there will be no net charge or discharge of the capacitance 6. On the other hand, if the switch unit 63 is driven so that the amount of time in the respective positions X and Y is unequal over a given period of time then the charge on the capacitance 6 will move towards one or the other of the two thresholds causing switch over of the latch LCH when the threshold in question is reached. The response time of the arrangement (e.g. the time taken for the voltage corresponding to the charge on the capacitance 6 to move from one threshold to the other) assuming a one hundred percent unbalance between the amount of time occupied by the switch unit 63 in the respective positions X and Y depends upon the size of the capacitance 6 and the upon the magnitude of the current supplied by the constant current sources 61 and 62.

If required, the constant current sources 61 and 62 may be proportioned relative to each other so that the response time in one direction is less than that in the other. For the purposes of this description, the direct current source to which the input 66 is connected is such that the comparator 64 reacts, as described, to the current via the input 65 being positive or negative. Other possibilities are available whereby the source to which the input 66 is connected serves as a threshold requiring the magnitude of the current flowing via the input 65 to be of a given magnitude (in either a positive or negative direction) for the output of the comparator 64 to be activated to cause changeover of the switching unit 63. Still further possibilities are available in the nature of the switching unit 63. Such other possibilities and further possibilities should be considered depending upon the control characteristics that are desired.

If desired, a completely different input threshold system for the comparator 64 may be used in lieu of that shown in FIG. 6 by replacing the current difference detector CDD and the comparator 64 by a threshold circuit which compares the instantaneous magnitude of the alternating signal voltage developed across the sensing resistance RT with equal and opposite threshold voltage limits set by a reference voltage and controls the switch position of the unit 63 in such a manner that position X is occupied by the unit 63 whenever the signal voltage exceeds the limits and position Y is occupied by the unit 63 whenever the signal voltage is within the limits.

In the foregoing description of the invention, reference is made to the average peak-to-peak magnitude of the sensed alternating current and to the average peak-to-peak magnitude of a reference alternating current. In FIG. 2 (b), it is intended that the line 23 depicts a value corresponding with the average peak-to-peak magnitude of the reference alternating current flowing in the adjustable resistance RS at a given adjustment thereof, which value remains constant. On the other hand, in FIG. 2 (b) it is intended that the line 22 depicts a value corresponding with the average peak-to-peak magnitude of the sensed alternating current flowing in the temperature sensitive resistance RT, which value changes with change in the temperature to which the resistance RT is exposed. As indicated previously, the line 24 in FIG. 2 (c) depicts a value corresponding with the difference between the values represented respectively by the lines 22 and 23 of FIG. 2 (b). However, although the line 25 in FIG. 2 (d) depicts the voltage representing the charge on the capacitance 6, the line 25 does not represent, throughout its length, the integral of the value denoted by the line 24. Nevertheless, the portions of the line 25 between the instants t1 and t2, between the instants t3 and t4, between the instants t5 and t6, between the instants t7 and t8 and between the instants t9 and t10 are intended to represent the integral of the value denoted by the line 24 within the corresponding portions thereof. The portions referred to in the preceding sentence corresponds with intervals when the voltage on the capacitance 6 is effective as a control voltage.

It will be appreciated that the invention is not limited to the embodiments described herein, but many further variations are possible for those skilled in the art without departing from the scope of invention. For example, although the invention is described herein with the said sensing element in the form of a temperature sensing element, the invention is also applicable to other kinds of sensing elements, e.g. humidity dependent capacitance.

Furthermore, although the invention has been described with reference to the sensed alternating current decreasing with increasing temperature, the invention is also applicable in general to any applications in which the sensed alternating current increases with an increase or decrease as the case may be in a control parameter.

As will be appreciated by the man skilled in the art, modifications may be needed to the circuit arrangements to take into account such differences in different applications without necessarily departing from the scope of the invention.

We claim:

1. A circuit arrangement comprising: a triac via which a load is supplied with current from an alternating voltage supply source under the control of a triac trigger control means in combination with a sensing element, wherein said sensing element is energized by alternating current derived from and continuously proportional to the alternating voltage supply source to produce a sensed alternating current, and said triac trigger control means includes an integration means for producing a control signal, triggering of the triac being determined by the state of a latch actuated in response to the magnitude of the control signal relative to one or more threshold levels, during at least one state of the latch the control signal produced by the integration means representing the integral of the difference between a value corresponding to the instantaneous value of the sensed alternating current and a reference current value.

2. A circuit arrangement as claimed in claim 1 wherein said control signal is produced by integration of the difference between the instantaneous value of the sensed alternating current and that of a reference alternating current.

3. A circuit arrangement as claimed in claim 1 wherein the latch is arranged so that actuation of said latch in response to the magnitude of said control signal can be carried out only when the latch is in a given state, such actuation being in response to the magnitude of the control signal relative to a single chosen threshold level, actuation of the latch when in its opposite state being produced by means independent of said control signal.

4. A circuit arrangement as claimed in claim 3 wherein said latch is arranged to automatically return to said given state at the end of a fixed time period in said opposite state.

5. A circuit arrangement as claimed in claim 3 wherein the latch is connected to function as a cyclic switch controlling the triggering of said triac in accordance with a duty cycle having a fixed time interval of continuous triac triggering and a variable time interval of non-triggering or vice versa, the length of each variable time interval being determined by the time taken for the magnitude of the control signal to reach the chosen threshold level.

6. A circuit arrangement as claimed in claim 1 wherein the latch has a first state and a second state and changeover of the latch from one said state to the other said state is actuated by the control signal exceeding a first threshold level, whereas changeover of the latch from the other said state to the one said state is actuated by the control signal falling below a second threshold level.

7. A circuit arrangement as claimed in claim 6 wherein the triac trigger control means is arranged so that said latch functions as a cyclic switch controlling the triggering of the triac in accordance with a duty cycle having a fixed time interval of continuous triac triggering and a variable time interval of non-triggering or vice versa.

8. A circuit arrangement as claimed in claim 7 wherein the triac control means includes a source of constant current and is arranged so that the length of each variable time interval is determined during one latch state by the time taken for the magnitude of said control signal to reach one threshold level, and during the other latch state the control signal produced by the integration means is determined by the source of constant current and changes in magnitude at such a rate as to reach the other threshold level at the end of a fixed time interval.

9. A circuit arrangement as claimed in claim 6 wherein the triac trigger control means is arranged so that said latch functions as a cyclic switch controlling the triggering of the triac in accordance with a duty cycle having a variable time interval of continuous triac triggering and a variable time interval of non-triggering.

10. A circuit arrangement as claimed in claim 9 wherein the integration means comprises a capacitance which is charged and discharged at a rate proportional to the difference in magnitude between the sensed alternating current and the reference alternating current, with a voltage corresponding to the charge on said capacitance serving as the said control signal whereby the respective durations of both variable time intervals, commencing from the instant of latch changeover, is determined by the time taken for the control signal to reach the threshold level for the next latch actuation.

11. A circuit arrangement as claimed in claim 9 wherein the triac trigger control means comprises comparator means for comparing the sensed alternating current with said reference alternating current thereby producing a first output signal when the sensed alternating current exceeds the reference alternating current and a second output signal when the sensed alternating current is below the reference alternating current, and switching means for coupling a first constant current source and a second constant current source to said integration means in response to the first output signal and the second output signal, respectively.

12. A circuit arrangement as claimed in claim 2 wherein said sensed alternating current is derived from a first junction of said sensing element with a first fixed resistance in series therewith thereby forming a first voltage divider network, and said reference alternating current is derived from a second junction of an adjustable resistance with a second fixed resistance in series therewith thereby forming a second voltage divider network, the first and second voltage divider networks being connected in parallel with each other.

13. A circuit arrangement as claimed in claim 12 wherein said first and second voltage divider networks are directly connected across the alternating voltage supply source.

14. A circuit arrangement as claimed in claim 12 further comprising a feedback path extending from a junction of the triac with the load to the first junction or to the second junction.

15. A circuit arrangement as claimed in claim 12 wherein the first and second voltage divider networks are connected between one terminal of the alternating voltage supply source and a junction of the said triac with the load, the first junction being connected via a third fixed resistance to the other terminal of the alternating voltage supply source and the second junction being connected via a fourth fixed resistance to the other terminal of said alternating voltage source, the relative values of the first and second fixed resistance being such that with each change of state of the latch, current drive for said sensing element and said adjustable resistance is further out of balance than if said first and second fixed resistance were of equal value.

16. A circuit arrangement as claimed in claim 2 wherein the latch is arranged so that actuation of said latch in response to said control signal can be carried out only when the latch is in a given state, such actuation being in response to the magnitude of the control signal relative to a single chosen threshold level, actuation of the latch when in its opposite state being produced by means independently of to said control signal.

17. A circuit arrangement as claimed in claim 4 wherein the latch is connected to function as a cyclic switch controlling the triggering of said triac in accordance with a duty cycle having a fixed time interval of continuous triac triggering and a variable time interval of non-triggering or vice versa, the length of each variable time interval being determined by the time taken for said control signal to reach the chosen threshold level.

18. A circuit arrangement as claimed in claim 2 wherein the latch has a first state and a second state and changeover of the latch from one said state to the other said state is actuated by the control signal exceeding a first threshold level, whereas changeover of the latch from the other said state to the one said state is actuated by the control signal falling below a second threshold level.

19. A circuit arrangement as claimed in claim 17 wherein said sensed alternating current is derived from a junction of said sensing element with a first fixed resistance in series therewith thereby forming a first voltage divider network, and said reference alternating current is derived from a junction of an adjustable resistance with a second fixed resistance in series therewith thereby forming a second voltage divider network, the first and second voltage divider networks being connected in parallel with each other.

20. A circuit arrangement as claimed in claim 1 wherein the triac trigger control means controls the latch so that it functions as a cyclic switch to control triggering of the triac with a duty cycle having a fixed time interval and a variable time interval.

21. A circuit arrangement as claimed in claim 1 wherein said sensing element is responsive to a variable parameter other than load current.

22. A circuit arrangement as claimed in claim 13 further comprising a current difference detector coupled to said first and second voltage divider networks and to said integration means.

23. A circuit for controlling the supply of electric energy to a load, said control circuit comprising:

a pair of input terminals for connection to a source of AC supply voltage, a bi-directional semiconductor switching device having a control electrode, means including said bi-directional semiconductor switching device for controlling the flow of AC current from said pair of input terminals to the load, a sensing element energized by an AC current derived from an AC voltage at said pair of input terminals to produce a sensed alternating current determined by a variable parameter, and control means for deriving a first control signal that is supplied to the control electrode of the bi-directional semiconductor switching device to control the switching thereof, said control means comprising:

means for generating an AC reference current that is derived from the AC voltage at the pair of input terminals, integration means for deriving a second control signal determined by the integral of the difference between the sensed alternating current and the AC reference current, and a bi-stable circuit which derives the first control signal as a function of the magnitude of the second control signal relative to at least one reference threshold level.

24. A control circuit as claimed in claim 23 wherein said reference current generating means comprises a bridge-type circuit coupled to said pair of input terminals and which includes the sensing element in one arm of the bridge-type circuit, and an adjustable impedance element in another arm thereof for selection of a desired value of the parameter.

25. A control circuit as claimed in claim 23 wherein said integration means includes a capacitor which is charged and discharged at a rate proportional to the difference in magnitude between the sensed alternating current and the reference alternating current and the sensing element is energized independently of the state of the bi-directional semiconductor switching device.

26. A control circuit as claimed in claim 25 wherein said sensing element and said reference current generating means together form a current sensing network, said control circuit further comprising a feedback circuit coupled between the load and the current sensing network so as to increase the charge rate or discharge rate of said capacitor.

* * * * *